(12) United States Patent
Liu et al.

(10) Patent No.: US 10,109,132 B2
(45) Date of Patent: Oct. 23, 2018

(54) SAMPLING METHOD AND SAMPLING APPARATUS FOR ANTI-COUNTERFEITING INFORMATION ABOUT CASH NOTE

(71) Applicant: GRG Banking Equipment Co., Ltd., Guangzhou, Guangdong (CN)

(72) Inventors: Hui Liu, Guangdong (CN); Zhuwen Chen, Guangzhou (CN); Bihai Yuan, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/536,060

(22) PCT Filed: Aug. 24, 2015

(86) PCT No.: PCT/CN2015/087899
§ 371 (c)(1),
(2) Date: Jun. 14, 2017

(87) PCT Pub. No.: WO2016/095557
PCT Pub. Date: Jun. 23, 2016

(65) Prior Publication Data
US 2017/0352222 A1 Dec. 7, 2017

(30) Foreign Application Priority Data

Dec. 19, 2014 (CN) .......................... 2014 1 0809269

(51) Int. Cl.
*G07F 19/00* (2006.01)
*G07D 7/04* (2016.01)
*G06K 7/08* (2006.01)

(52) U.S. Cl.
CPC .............. *G07D 7/04* (2013.01); *G06K 7/084* (2013.01)

(58) Field of Classification Search
CPC .. G07D 7/00; G07D 7/01; G07D 7/02; G07D 7/04; G07D 7/12; G07D 7/121;
(Continued)

(56) References Cited

U.S. PATENT DOCUMENTS 5,970,165 A    10/1999  Itako
8,083,136 B1*  12/2011  Brown ................. G06Q 20/042
                                                         235/380
(Continued)

FOREIGN PATENT DOCUMENTS

CN    102077253 A    5/2011
CN    102592350 A    7/2012
(Continued)

OTHER PUBLICATIONS

International Search Report for Application No. PCT/CN2015/087899 dated Dec. 1, 2015.

*Primary Examiner* — Steven S Paik
*Assistant Examiner* — April Taylor
(74) *Attorney, Agent, or Firm* — Wolf, Greenfield & Sacks, P.C.

(57) ABSTRACT

Disclosed are a sampling method for anti-counterfeiting information about a cash note, and a sampling apparatus for anti-counterfeiting information about a cash note, which executes the method. The sampling method for anti-counterfeiting information about a cash note comprises: through differences collected between sensors, utilizing a law of the differences to restore spatially coupled power-frequency of low-frequency electromagnetic interference signals acquired by an effective signal sensor (21); and then performing common-mode signal elimination on voltage waveform data corresponding to the anti-counterfeiting information, thereby thoroughly elimination the spatially coupled power-frequency or low-frequency electromagnetic interfer- (Continued)

ences that magnetic signal sensors suffer from during the collection of magnetic anti-counterfeiting signals.

9 Claims, 2 Drawing Sheets

(58) Field of Classification Search
CPC .. G07D 7/14; G07D 7/15; G07D 7/16; G07D 7/17; G07D 7/20; G06K 7/084
See application file for complete search history.

(56) References Cited

U.S. PATENT DOCUMENTS

| | | |
|---|---|---|
| 9,428,358 B2 * | 8/2016 | Gao .......................... B65H 7/02 |
| 2004/0218802 A1 * | 11/2004 | Suzuki ................. G06Q 20/042 382/137 |
| 2010/0052307 A1 * | 3/2010 | Schutzmann .......... G07D 7/004 283/67 |
| 2010/0102234 A1 * | 4/2010 | Hamasaki ............... G07D 7/121 250/341.7 |
| 2011/0089939 A1 | 4/2011 | Kim et al. |
| 2013/0161391 A1 | 6/2013 | Schmalz et al. |
| 2014/0249769 A1 * | 9/2014 | Liao ................... G07D 11/0084 702/128 |

FOREIGN PATENT DOCUMENTS

| | | |
|---|---|---|
| CN | 104484937 A | 4/2015 |
| EP | 2608160 A2 | 6/2013 |
| JP | 2004-125526 A | 4/2004 |

\* cited by examiner

| cash note sampling interval | effective information sampling interval of the first cash note | cash note sampling interval | effective information sampling interval of the second cash note | cash note sampling interval |
|---|---|---|---|---| time requirements unchanged

| cash note sampling interval | newly added data sampling interval | effective information sampling interval of the first cash note | cash note sampling interval | newly added data sampling interval | effective information sampling interval of the second cash note | cash note sampling interval | newly added data sampling interval |
|---|---|---|---|---|---|---|---|

FIG. 3

SAMPLING METHOD AND SAMPLING APPARATUS FOR ANTI-COUNTERFEITING INFORMATION ABOUT CASH NOTE

CROSS-REFERENCE TO RELATED APPLICATIONS

This application is the national phase of International Application No. PCT/CN2015/087899, titled "SAMPLING METHOD AND SAMPLING APPARATUS FOR ANTI-COUNTERFEITING INFORMATION ABOUT CASH NOTE", filed Aug. 24, 2015, which claims priority to Chinese Patent Application No. 201410809269.4, titled "SAMPLING METHOD AND SAMPLING APPARATUS FOR ANTI-COUNTERFEITING INFORMATION ABOUT CASH NOTE", filed with the State Intellectual Property Office of the People's Republic of China on Dec. 19, 2014. Both of the aforementioned applications are hereby incorporated by reference in their entireties.

FIELD OF THE INVENTION

The present disclosure relates to the field of electromagnetic signal processing, and in particular to a sampling method for anti-counterfeiting information of a cash note.

BACKGROUND OF THE INVENTION

Currently, automatic teller machines for cash notes have been of wide use and cash note counting and sorting machines for counting and sorting cash notes have also been widely applied, both of which are provided with a plurality types of magnetic sensors with high sensitivity to detect anti-counterfeiting information of bank notes. Since magnetic anti-counterfeiting information in a cash note is very weak, a fine amplifying circuit with low noise and extremely high magnification is needed to detect the magnetic information. The inherent characteristic of the amplifying circuit with high sensitivity is that it is susceptible to interference, and in practical application, the automatic teller machine is not always easy to move due to restrictions on operational environment and installation method. When a high-power transformer or alternating-current electrical equipment exists near the automatic teller machine, with a large increase in electrical load, the intensity of a power-frequency electromagnetic field generated through space radiation increases rapidly and an interference source beyond the normal tolerability of the equipment may be generated quite easily. Even though the electrical equipment has passed various kinds of electromagnetic compatibility certification, power-frequency interference signals may be induced in the high-sensitivity magnetic sensor, which include low-frequency interference signals of 50 hertz and 60 hertz or higher-harmonic interference signals of several hundred hertz, and the interference signals will be outputted with their level superimposed on that of the effective anti-counterfeiting signals detected by the sensor.

In the operating process of an existing automatic teller machine for cash notes and an existing cash note counting and sorting machine, anti-counterfeiting information collecting is performed on deposited cash notes and withdrawn cash notes synchronously. The cash notes pass through an induction region in sequence at a certain interval. The sensor collects and obtains magnetic anti-counterfeiting information from each cash note passing by it, and determine whether the anti-counterfeiting information is correct by computation processing or data comparison to identify authenticity of the cash note.

During the process of the sensor collecting and obtaining magnetic anti-counterfeiting information from each cash note passing by it, if the effective anti-counterfeiting signal collected by the sensor is interfered, incorrect anti-counterfeiting signal voltage waveform may be collected by the sensor and thus misjudgment may be made by an equipment. As a result, the equipment is incapable of identifying anti-counterfeiting information of the cash note normally, and deposit rejection or withdrawal rejection occurs in large numbers. At this time, the financial equipment can not work properly due to special security requirements on financial equipment. Moreover, since there are plenty of magnetic sensors in an automatic teller machine (ATM) or a cash note counting and sorting machine and the sensors are installed in different locations in the equipment, interference signals detected from the sensors are of significant difference, referring to FIG. 1, which is a schematic diagram of difference between interference signals detected from two sensors at different locations in the equipment, thus the difficulty of elimination of interference signals is increased. In the prior art, power-frequency interference is eliminated by way of complicated software algorithm and FFT transform in most cases. However, processing output signals of the sensors separately consumes considerable system resources and also tends to cause attenuation of effective signals. Besides, the prior measure of shielding space electromagnetic field to resist low-frequency electromagnetic interference requires an increased cost on shielding material, and the financial equipment may not be shielded completely for its application requirement. The measure of resisting interference applied to electrical equipment requires extracting power-frequency signals from mains supply, and the power-frequency interference signals extracted may have phase difference with interference signals coupled in the magnetic sensor by space coupling, so phase compensation is required, resulting in a complicated circuit. Furthermore, there may also be difference in the frequency information of the interference source, which results in the impossibility of restoring real interference signal accurately.

SUMMARY OF THE INVENTION

One of the objectives of the present disclosure is to provide a sampling method for anti-counterfeiting information of a cash note to eliminate the power-frequency and low-frequency electromagnetic interferences caused by space radiation that magnetic signal sensors suffer from during the process of identifying bank notes by an automatic teller machine for cash notes and a cash note counting and sorting machine.

Another objective of the present disclosure is to provide a sampling apparatus for anti-counterfeiting information of a cash note which executes the method above.

The present disclosure provides a sampling method for anti-counterfeiting information of a cash note, and the method includes: step 1, collecting voltage waveform data $V_{interference}$ outputted by a sensor for obtaining interference signals and voltage waveform data $V_{effective}$ outputted by a sensor for obtaining effective signals, during a sampling interval of obtaining anti-counterfeiting information of cash notes by the sensor for obtaining effective signals; step 2, calculating a response ratio coefficient K of the sensor for obtaining interference signals and the sensor for obtaining effective signals with respect to electromagnetic interference signals according to the formula $K=V_{effective}/V_{interference}$; step 3, sampling, by the sensor for obtaining effective signals, anti-counterfeiting information of a cash note, and outputting voltage waveform data $V'_{effective}$ corresponding to the anti-counterfeiting information; step 4, collecting voltage waveform data $V'_{interference}$ outputted by the sensor for obtaining interference signals during a time period of the cash note passing through the sensor for obtaining effective signals; step 5, restoring voltage waveform data $V_{superposition}$ superposed with an electromagnetic interference signal and outputted from the sensor for obtaining effective signals according to the formula $V_{superposition}=K*V'_{interference}$; and step 6, performing common-mode signal elimination on the voltage waveform data corresponding to the anti-counterfeiting information according to the formula $V_{anti-counterfeiting}=V'_{effective}-V_{superposition}$, to obtain voltage waveform data $V_{anti-counterfeiting}$ corresponding to the anti-counterfeiting information after performing the common-mode signal elimination.

Specifically, the method returns to step 1 after step 6 is finished, and steps 1 to 6 are looped, so as to complete the sampling of anti-counterfeiting information of all cash notes.

Preferably, step 1 and step 2 are finished within the sampling interval of cash notes, and the sampling interval of cash notes refers to a period from the termination of sampling a cash note to the beginning of sampling a next cash note.

A sampling apparatus for anti-counterfeiting information of a cash note includes a sensor for obtaining effective signals and a sensor for obtaining interference signals. The sensor for obtaining effective signals is located above a passage for cash notes and the sensor for obtaining interference signals is arranged near the sensor for obtaining effective signals.

Preferably, there are multiple sensors for obtaining effective signals in the sampling apparatus, the multiple sensors for obtaining effective signals form an array, and, each of the multiple sensors for obtaining effective signals is arranged vertically facing the passage for cash notes.

In the solution according to the present disclosure, differences between sensors are collected, spatially coupled power-frequency or low-frequency electromagnetic interference signals obtained by the sensor for obtaining effective signals are restored by using the pattern of the differences; and common-mode signal elimination is performed on the voltage waveform data corresponding to the anti-counterfeiting information, thereby thoroughly eliminating the spatially coupled power-frequency or low-frequency electromagnetic interferences that magnetic signal sensors suffer from during the collection of magnetic anti-counterfeiting signals. Also, in the present disclosure the calculation of coefficient is performed during sampling intervals of cash notes without affecting the effective processing time in existing cash identifying, and the coefficient calculation and common-mode elimination processing involved are simple in the aspect of computation.

BRIEF DESCRIPTION OF THE DRAWINGS

FIG. 3 is a schematic diagram of the proportion of a newly added data sampling time period in a sampling interval.

DETAILED DESCRIPTION OF THE EMBODIMENTS

Figure 1:
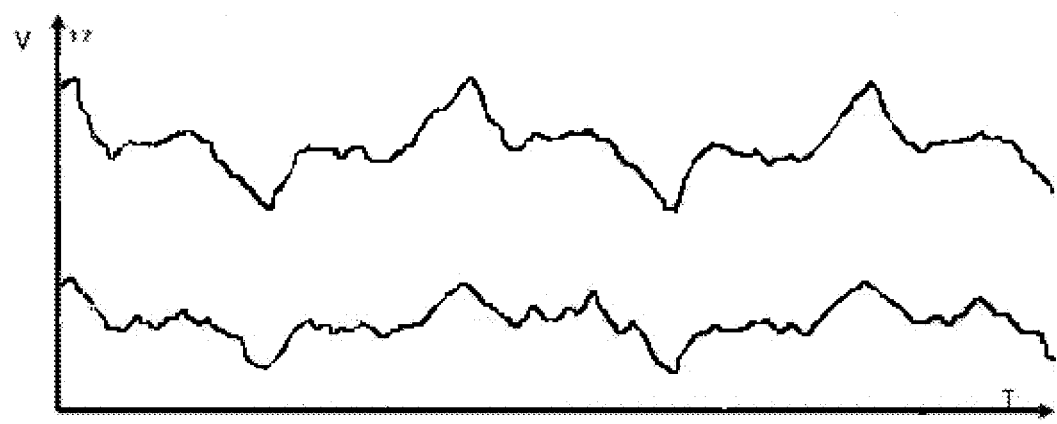
FIG. 1 is a schematic diagram showing the difference between interference signals of two sensors located in different positions in a device.
Figure 2:
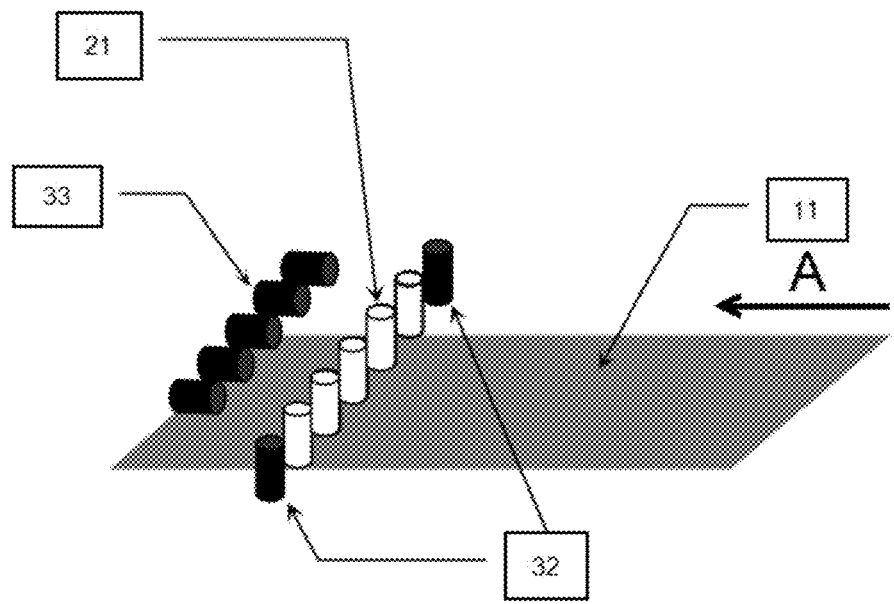
FIG. 2 is a diagram showing main structures of a sampling apparatus for anti-counterfeiting information of a cash note.

Modes and methods of implementation of the present disclosure are illustrated hereinafter with reference to the drawings. According to the application of a sampling method for anti-counterfeiting information of a cash note of the present disclosure in an automatic teller machine for cash notes, a sampling apparatus for anti-counterfeiting information of a cash note according to an embodiment is shown in FIG. 2. The sampling apparatus for anti-counterfeiting information of a cash note includes: sensors 21 for obtaining effective signals, existing sensors 32 for obtaining interference signals and newly added sensors 33 for obtaining interference signals, and a cash note 11 to be identified and a moving direction A of the cash note are also indicated in FIG. 2.

Generally, the sensor 21 for obtaining effective magnetic anti-counterfeiting information of a cash note is installed in a passage of a cash note identification module. There may be one or multiple sensors 21 for obtaining effective signals. In a case that there are multiple sensors 21 for obtaining effective signals, the multiple sensors 21 are arranged in a direction perpendicular to the moving direction A of the cash note. In this embodiment, there are five sensors 21, and the arrangement of the sensors 21 may be, but not limited to, similar to that shown in FIG. 2.

The newly added sensors 33 for obtaining interference signals are installed beside or near the existing sensors 32 for obtaining interference signals, as shown in FIG. 2. In this embodiment, there are five newly added sensors 33 for obtaining interference signals arranged in parallel behind the array of the sensors 21 for obtaining effective signals, and the direction of the newly added sensors 33 for obtaining interference signals is perpendicular to that of the sensors 21 for obtaining effective signals. The existing sensors 32 for obtaining interference signals are distributed on two ends of the array of the sensors 21 for obtaining effective signals and are outside the boundary of the cash note. Practically, the arrangement of the newly added sensors 33 for obtaining interference signals is not limited to the arrangement shown in FIG. 2. In practical applications, it is required to adjust the installation direction or location of the newly added sensors 33 for obtaining interference signals or to adopt other measures including shelter, to ensure the sensors 32, 33 for obtaining interference signals can not obtain effective information for anti-counterfeiting identification of a cash note when collecting voltage waveform data of anti-counterfeiting signals from the cash note.

The principles and methods of the sampling method for anti-counterfeiting information of a cash note according to the embodiment are described hereinafter. In view of the fact that the spatially coupled power-frequency or low-frequency electromagnetic interference signals have low frequency, according to the theory of electromagnetic wave, the wavelength of interference signals of 50 hertz in spatial propagation is about 6000 kilometers. By comparison, the difference in installation positions of different magnetic sensors inside the automatic teller machine for cash notes and the cash note counting and sorting machine is very tiny, therefore the difference in phase between interference signals obtained by the sensor 32 for obtaining interference signals and those obtained by the sensors 21 for obtaining effective signals is nearly zero. The voltage waveform signals outputted by the sensor 32 for obtaining interference signals and the sensor 21 for obtaining effective signals are described in the following two formulas respectively:

$$V_{interference} = K_1 \sin(\omega_1 t + \phi_1);$$

$$V_{effective} = K_2 \sin(\omega_2 t + \phi_2);$$

where $\omega$ represents the angular velocity corresponding to the frequency of an interference source, $\phi$ represents the phase information of corresponding signals, $K_1$ and $K_2$ are actually detected signal amplitudes; since $\omega$ is for the same interference source and the same sensors, it is considered that $\omega_1 = \omega_2$, and it is known that $\phi_1 = \phi_2$ according to the above descriptions.

In view of the above, by just collecting waveform data signals in more than a half cycle, finding the maximum value among amplitudes of the collected waveform data signals by comparison, determining an amplitude of a voltage waveform signal outputted by the sensor 32 for obtaining interference signals as a reference value, and dividing an amplitude of a voltage waveform signal outputted by the sensor 21 for obtaining effective signals by the reference value, a ratio coefficient of amplitude can be figured out, i.e.: $K = V_{effective}/V_{interference} = K_2/K_1$. Here K represents a ratio coefficient of amplitude responses of the two above sensors to spatially coupled power-frequency or low-frequency electromagnetic interference signals. By use of K, mutual transformation between the voltage waveforms of spatially coupled power-frequency or low-frequency electromagnetic interference signals obtained by the sensor 32 for obtaining interference signals and those obtained by the sensor 21 for obtaining effective signals can be achieved.

A sampling method for anti-counterfeiting information of a cash note includes the following steps 1 to 6: step 1, collecting voltage waveform data $V_{interference}$ outputted by a sensor for obtaining interference signals and voltage waveform data $V_{effective}$ outputted by a sensor for obtaining effective signals during a sampling interval of collecting anti-counterfeiting information of cash notes by the sensor for obtaining effective signals; step 2, calculating a response ratio coefficient K of the sensor for obtaining interference signals and the sensor for obtaining effective signals with respect to electromagnetic interference signals according to the formula $K = V_{effective}/V_{interference}$; step 3, sampling, by the sensor for obtaining effective signals, anti-counterfeiting information of a cash note, and outputting voltage waveform data $V'_{effective}$ corresponding to the anti-counterfeiting information; step 4, collecting voltage waveform data $V'_{interference}$ outputted by the sensor for obtaining interference signals during a time period of the cash note passing through the sensor for obtaining effective signals; step 5, restoring voltage waveform data $V_{superposition}$ superposed with an electromagnetic interference signal and outputted from the sensor for obtaining effective signals according to the formula $V_{superposition} = K*V'_{interference}$; and step 6, performing common-mode signal elimination on the voltage waveform data corresponding to the anti-counterfeiting information according to the formula $V_{anti-counterfeiting} = V'_{effective} - V_{superposition}$, to obtain voltage waveform data $V_{anti-counterfeiting}$ corresponding to the anti-counterfeiting information after performing the common-mode signal elimination. In step 1 and step 2, in the process of collecting and obtaining magnetic anti-counterfeiting information of each cash note passing through the sensor, voltage waveform signal data outputted by the sensor 32 for obtaining interference signals and the sensor 21 for obtaining effective signals is collected in sampling intervals of the cash notes, to calculate the value of K.

In steps 3 to 5, an anti-counterfeiting signal of each cash note is collected, and after finishing the collection of the anti-counterfeiting signal of each cash note, voltage waveform data $V'_{interference}$ outputted by the sensor 32 for obtaining acquiring interference signals within the time period of the cash note passing through the sensor 21 for obtaining effective signals is multiplied by K to obtain new voltage waveform data, the new voltage waveform data being voltage waveform data of power-frequency or low-frequency electromagnetic interference signals which is included in the voltage waveform data outputted by the sensor 21 for obtaining effective signals, i.e.: $V_{superposition} = K*V'_{interference}$.

In step 6, the voltage waveform data outputted by the sensor 21 for obtaining effective signals during the process of collecting the anti-counterfeiting signal of each cash note includes an interference signal and the anti-counterfeiting signal of the cash note, which is the superposition of the interference signal and the anti-counterfeiting signal in time domain and can be described by the formula: $V'_{effective} = V_{superposition} + V_{anti-counterfeiting}$. By subtracting restored data $V_{superposition}$ from the voltage waveform data of the anti-counterfeiting signal of the cash note collected and outputted by the sensor 21 for obtaining effective signals, common-mode signal elimination is achieved, thereby eliminating electromagnetic interference signals, and obtaining accurate voltage waveform data of the anti-counterfeiting signal of the cash note, which is described by the formula: $V_{anti-counterfeiting} = V'_{effective} - V_{superposition}$.

In specific implementations, it is preferable to add a new data sampling interval, which is half a cycle (10 milliseconds) of an interference signal with a frequency of no less than 50 hertz, before sampling the data of each cash note, as shown in FIG. 3, and the value of K is calculated during the added data sampling interval. After completing the collection of anti-counterfeiting data of a cash note, voltage waveform of the interference signal received by the sensor 21 for obtaining effective signals can be obtained by use of K, and then common-mode signal elimination is performed on the voltage waveform data corresponding to the anti-counterfeiting information, thereby thoroughly eliminating the spatially coupled power-frequency or low-frequency electromagnetic interferences that magnetic signal sensors suffer from during the collection of magnetic anti-counterfeiting signals.

In the embodiment, the added data sampling time is at least about 10 milliseconds, avoiding impacting on effective processing time at the speed of existing cash identification processing, that is, as illustrated in FIG. 3, the added data sampling time is less than the normal cash sampling interval of the existing cash identification processing device. Therefore adding the data sampling time has no impact on the effective processing time. In addition, the involved coefficient calculation and common-mode elimination processing are simple in computation, and has lower demand on system resources compared with FFT or complicated filtering algorithms, thereby having little influence on processing speed of the existing automatic teller machine for cash notes and the cash note counting and sorting machine, and having high realizability.

The foregoing description merely lists some preferred embodiments of the invention, and it should be noted that, the above preferable embodiments should not be interpreted as limiting the present disclosure. The protection scope of The present application is defined by the claims. For the person skilled in the art, many modifications and improvements may be made to the present disclosure without departing from the essence of the present disclosure, and these modifications and improvements also fall within the protection scope of the present disclosure

The invention claimed is:

1. A sampling method for anti-counterfeiting information of a cash note, comprising:
using an automated teller machine to
obtain, by a sensor for obtaining interference signals, voltage waveform data $V_{interference}$;
obtain, by a sensor for obtaining effective signals, voltage waveform data $V_{effective}$, wherein when the sensor for obtaining effective signals obtains voltage waveform data $V_{effective}$, the sensor for obtaining interference signals does not obtain anti-counterfeiting information of cash notes;
collect, voltage waveform data $V_{interference}$ and voltage waveform data $V_{effective}$ during a sampling interval of obtaining anti-counterfeiting information of cash notes by the sensor for obtaining effective signals;
calculate, a response ratio coefficient K of the sensor for obtaining interference signals and the sensor for obtaining effective signals with respect to electromagnetic interference signals according to a formula: $K=V_{effective}/V_{interference}$;
sample, by the sensor for obtaining effective signals, anti-counterfeiting information of the cash note, and outputting voltage waveform data $V'_{effective}$ corresponding to the anti-counterfeiting information;
collect, voltage waveform data $V'_{interference}$ outputted by the sensor for obtaining interference signals during a time period of the cash note passing through the sensor for obtaining effective signals;
restore, voltage waveform data $V_{superposition}$ superposed with an electromagnetic interference signal and outputted from the sensor for obtaining effective signals according to a formula $V_{superposition}=K*V'_{interference}$; and
perform, common-mode signal elimination on the voltage waveform data corresponding to the anti-counterfeiting information according to a formula $V_{anti-counterfeiting}=V'_{effective}-V_{superposition}$, to obtain voltage waveform data $V_{anti-counterfeiting}$ corresponding to the anti-counterfeiting information after performing the common-mode signal elimination.

2. The sampling method for anti-counterfeiting information of the cash note according to claim 1, wherein the sampling method returns to step for obtaining voltage waveform data $V_{interference}$ after step for performing common-mode signal elimination is finished and the automated teller machine loops the sampling method are looped, so as to complete the sampling of anti-counterfeiting information of all cash notes.

3. The sampling method for anti-counterfeiting information of the cash note according to claim 2, wherein step for voltage waveform data $V_{interference}$ and voltage waveform data $V_{effective}$ and step for calculating the response ratio coefficient K are finished within the sampling interval of cash notes and the sampling interval of cash notes refers to a period from the termination of sampling a cash note to the beginning of sampling a next cash note.

4. A sampling apparatus for anti-counterfeiting information of a cash note, comprising an automated teller machine configured to execute the sampling method for anti-counterfeiting information of the cash note according to claim 3; the sensor for obtaining effective signals; and the sensor for obtaining interference signals, wherein the sensor for obtaining effective signals is located above a passage for cash notes and the sensor for obtaining interference signals is arranged near the sensor for obtaining effective signals.

5. The sampling apparatus for anti-counterfeiting information of the cash note according to claim 4, comprising a plurality of sensors for obtaining effective signals, wherein the plurality of sensors for obtaining effective signals form an array, and each of the plurality of sensors for obtaining effective signals is arranged vertically facing the passage for cash notes.

6. A sampling apparatus for anti-counterfeiting information of a cash note, comprising an automated teller machine configured to execute the sampling method for anti-counterfeiting information of the cash note according to claim 2; the sensor for obtaining effective signals; and the sensor for obtaining interference signals, wherein the sensor for obtaining effective signals is located above a passage for cash notes and the sensor for obtaining interference signals is arranged near the sensor for obtaining effective signals.

7. The sampling apparatus for anti-counterfeiting information of the cash note according to claim 6, comprising a plurality of sensors for obtaining effective signals, wherein the plurality of sensors for obtaining effective signals form an array, and each of the plurality of sensors for obtaining effective signals is arranged vertically facing the passage for cash notes.

8. A sampling apparatus for anti-counterfeiting information of the cash note, comprising an automated teller machine configured to execute the sampling method for anti-counterfeiting information of the cash note according to claim 1; the sensor for obtaining effective signals; and the sensor for obtaining interference signals, wherein the sensor for obtaining effective signals is located above a passage for cash notes and the sensor for obtaining interference signals is arranged near the sensor for obtaining effective signals.

9. The sampling apparatus for anti-counterfeiting information of the cash note according to claim 8, comprising a plurality of sensors for obtaining effective signals, wherein the plurality of sensors for obtaining effective signals form an array, and each of the plurality of sensors for obtaining effective signals is arranged vertically facing the passage for cash notes.

* * * * *